US007475929B2

(12) United States Patent
Yamada

(10) Patent No.: US 7,475,929 B2
(45) Date of Patent: Jan. 13, 2009

(54) LID OPEN-CLOSE APPARATUS

(75) Inventor: Satoshi Yamada, Kanagawa (JP)

(73) Assignee: Piolax Onc., Yokohama-shi, Kanagawa-ken (JP)

( * ) Notice: Subject to any disclaimer, the term of this patent is extended or adjusted under 35 U.S.C. 154(b) by 380 days.

(21) Appl. No.: 11/189,014

(22) Filed: Jul. 26, 2005

(65) Prior Publication Data

US 2006/0055196 A1 Mar. 16, 2006

(30) Foreign Application Priority Data

Sep. 15, 2004 (JP) ........................ P. 2004-268965

(51) Int. Cl.
*B60R 27/00* (2006.01)

(52) U.S. Cl. ...................... 296/24.34; 296/37.12; 70/77

(58) Field of Classification Search ............. 296/24.34, 296/37.1, 37.8, 37.12; 70/77, 158, 159, 160
See application file for complete search history.

(56) References Cited

U.S. PATENT DOCUMENTS

| | | | | |
|---|---|---|---|---|
| 4,595,228 A * | 6/1986 | Chu | .......................... | 296/37.7 |
| 6,120,069 A | 9/2000 | Taranto | | |
| 2004/0017088 A1 | 1/2004 | Sawatani et al. | | |

FOREIGN PATENT DOCUMENTS

| | | |
|---|---|---|
| JP | 5-338500 | 12/1993 |
| JP | 6-146683 | 5/1994 |
| JP | 3220671 | 8/2001 |
| JP | 2004-3227 | 1/2004 |
| JP | 2004-211386 | 7/2004 |

OTHER PUBLICATIONS

International Search Report dated Nov. 16, 2005, with English translation and written opinion of the international searching authority.
Microfilm of the specification and drawings annexed to the request of Japanese Utility Model Application No. 139545/1983 (Laid-open No. 46765/1985, Shiroki Kinzoku Kogyo Kabushiki Kaisha, Apr. 2, 1985.
Microfilm of the specification and drawings annexed to the request of Japanese Utility Model Application No. 81267/1986 (Laid-open No. 193067/1987), Nissan Motor Co., Ltd., Dec. 8, 1987.

* cited by examiner

*Primary Examiner*—Lori L Lyjak
(74) *Attorney, Agent, or Firm*—McGinn IP Law Group, PLLC

(57) ABSTRACT

A lid open-close apparatus including: a lid openably mounted in a concave portion, which is provides at a vehicle side; a lock device for locking a closed state of the lid; and an operating element, which is disposed at the vehicle side close to the concave portion, for releasing the lock device, wherein: the lock device has a lock piece, which is provided in the lid and moves into and out of the lid from a peripheral edge thereof and is usually elastically pushed in such a way as to project from the peripheral edge thereof and engages with an engaging hole provided in an inner periphery of the concave portion; and the operating element has a pusher adapted to push a receiving portion, which is provided in a part interconnected to the lock piece, to thereby cancel engagement of the lock piece.

7 Claims, 9 Drawing Sheets

LID OPEN-CLOSE APPARATUS

BACKGROUND OF THE INVENTION

1. Field of the Invention

The present invention relates to a lid open-close apparatus for opening, closing, and locking, for example, a glove box of an automobile.

2. Description of the Related Art

A glove box is mounted on, for example, a front passenger seat side of an automobile instrument panel. This glove box is openably mounted in a concave portion provided in the instrument panel. The glove box has a locking piece, which engages with the inner periphery of the concave portion when closing the glove box, and an operating element for disengaging the locking piece therefrom by drawing back the locking piece. Various mechanisms for implementing the locking piece and the operating element have been known. The operating element is usually mounted on the face side of the glove box.

However, because the operating element is mounted on the face side of the glove box, for instance, when a driver wishes to open the glove box, he should operate the operating element by largely moving his body toward the front passenger seat side. Consequently, there has been a problem that during stopped at a tollbooth or the like, the glove box cannot quickly and readily be opened.

Thus, in the following JP-A-5-338500, there has been proposed a lock apparatus adapted so that an opener for unlatching a latch mechanism, which locks the glove box, through a remote control cable by pushing a pushbutton is disposed at a place located away from a position, at the glove box is disposed, toward the center of the instrument panel.

However, because the latch mechanism for locking the glove box is unlatched through a remote control cable by pushing a pushbutton, the lock apparatus has problems that the configuration thereof is complex, that the number of components is large, that the assembling thereof is time-consuming, and that the manufacturing cost thereof is high.

SUMMARY OF THE INVENTION

An object of the invention is to provide a lid open-close apparatus enabled to easily achieve opening and closing operations from a relatively remote position with a simple structure and with a small number of components.

To achieve the foregoing object, according to a first aspect of the invention, there is provided a lid open-close apparatus including a lid openably mounted in a concave portion, which is provided at a vehicle side, a lock device for locking a closed state of the lid, and an operating element, which is disposed at the vehicle side close to the concave portion, for releasing the lock device. The lock device has a lock piece, which is provided in the lid and moves into and out of the lid from a peripheral edge thereof and is usually elastically pushed in such a way as to project from the peripheral edge thereof and engages with an engaging hole provided in the inner periphery of the concave portion. The operating element has a pusher adapted to push a receiving portion, which is provided in a part interconnected to the lock piece, to thereby cancel the engagement of the lock piece.

According to a second aspect of the invention in the first aspect of the invention, there is provided a lid open-close apparatus, in which the lock device has a rotation lever turnably supported by the lid, a pair of link rods having base portions, which are pivotally mounted on opposed arm ends provided on the rotation lever, and extending in directions of both sides of the lid, the lock pieces attached to ends of the link rods, and an elastic member for elastically pushing the lock pieces in such a way as to project from both side walls of the lid.

According to a third aspect of the invention in the second aspect of the invention, there is provided a lid open-close apparatus, in which an end portion of one of the link rods is bifurcated into one end part, which extends nearly coaxially with the base portion and has an end constituting a receiving portion to be pushed by the pusher, and into the other end part extending in nearly parallel to the one end part and having an end constituting the lock piece, and wherein the elastic member disposed in such a way as to axially push the base portions of the link rods.

According to a fourth aspect of the invention in the second aspect of the invention, there is provided a lid open-close apparatus, in which an end portion of one of the link rods is bifurcated into one end part, which extends nearly coaxially with the base portion and has an end constituting the lock piece, and into the other end part extending in nearly parallel to the one end part and having an end constituting a receiving portion to be pushed by the pusher.

According to a fifth aspect of the invention in one of the first to fourth aspect of the invention, there is provided a lid open-close apparatus, in which the receiving portion provided in a part interconnected to the lock piece has a slope, which has a part provided at a face side thereof projects and a part provided at a rear side thereof retreats and provides a reaction force in a direction, in which the lid is opened, when pushed by the pusher.

According to a sixth aspect of the invention in one of the first to fifth aspect of the invention, there is provided a lid open-close apparatus, in which each of the lock pieces has a slope, which has a part provided at a face side of the lid projects and a part provided at a rear side of the lid retreats, and abuts against a peripheral edge of the concave portion and is drawn into the lid when the lid is closed, and in which the lock piece projects outwardly from the lid more largely than the receiving portion.

According to the invention, the pusher is pushed out by operating the operating element provided at a vehicle side. Thus, a receiving portion provided in a portion interconnected to the lock piece is pushed. Consequently, the engagement of the lock piece with the lid is canceled, so that the lid can be opened. Thus, the opening and closing of the lid can easily be performed from a relatively remote position. Further, the operating element has only to have a structure adapted to push the pusher thereby to simply push the receiving portion provided in the portion interconnected to the lock piece. Thus, the configuration of the apparatus is simple. The number of components thereof is small. The assembling thereof can be facilitated. The manufacturing cost thereof can be reduced.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Next, an embodiment of a lid open-close apparatus according to the invention is described herein below by referring to FIGS. 1 to 8.

Figure 1:
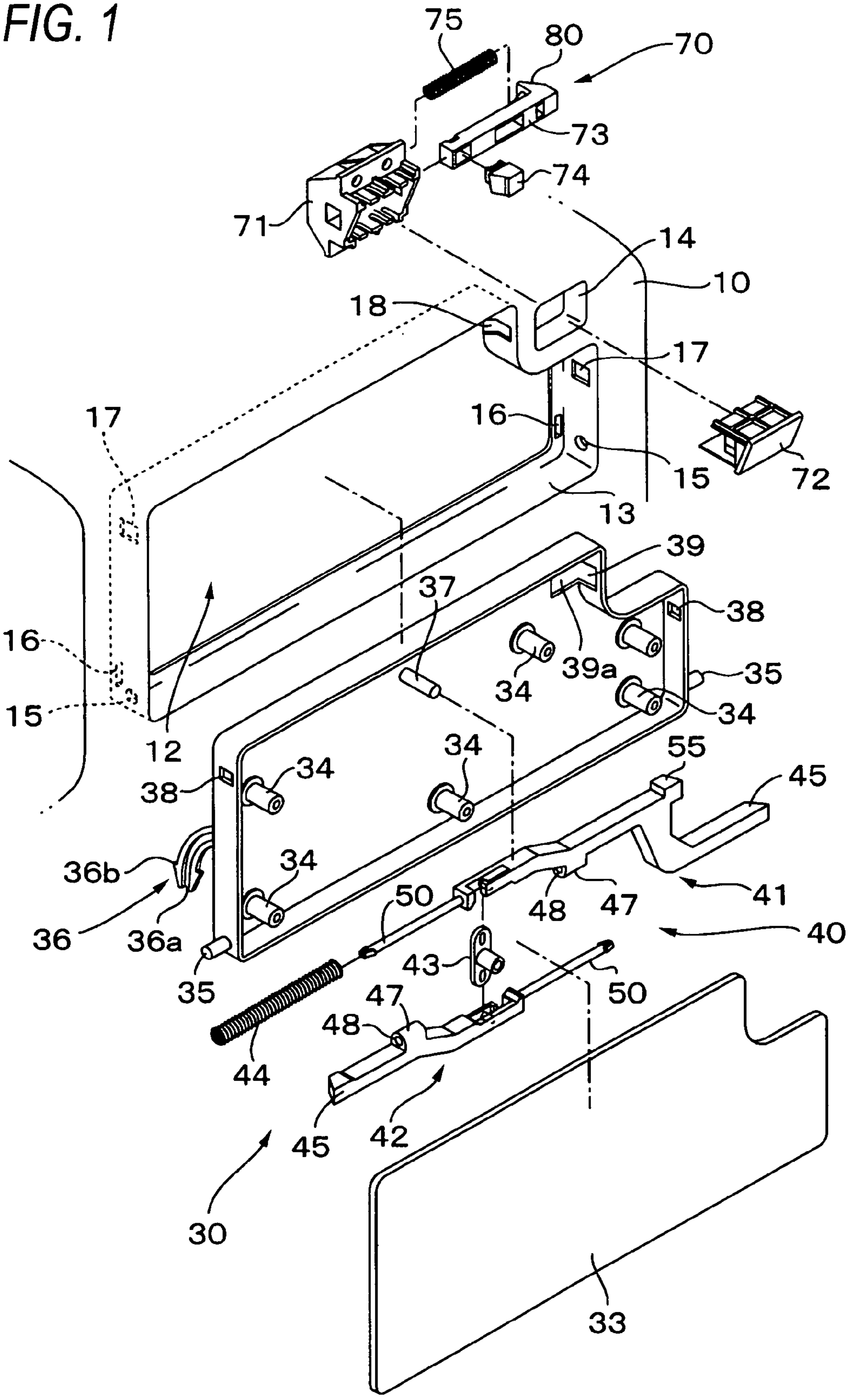
FIG. 1 is an exploded perspective view illustrating an embodiment of a lid open-close apparatus according to the invention.

As shown in FIG. 1, this lid open-close apparatus has a lid 30 openably mounted in a concave portion 12, which is provided in an instrument panel 10 of an automobile. In the case of this embodiment, the concave portion 12 is shaped like a laterally-elongated rectangle, and a rightwardly upwardly corner portion is inwardly cut out, as viewed in the figure. Thus, the lid 30 is also shaped like a laterally-elongated rectangle, which can be fitted to the concave portion 12. The rightwardly upwardly corner portion thereof is inwardly cut out. Further, the instrument panel 10 has a mounting hole 14 for mounting an operating element 70 at the rightwardly upper part of the concave portion 12.

The lid 30 includes a lid body 31 and a face plate 33 fitted to a peripheral wall 32. Plural cylindrical spacers 34 are erected on the inner surface of the lid body 31. When the faceplate 33 is fitted thereto, the faceplate 33 is fixedly attached to the spacers 34 by means such as adhesion or screwing. Paired shafts 35, 35 are attached to bottom parts of both sides of the peripheral wall 32 of the lid body 31 in such a way as to project from both lateral sides, respectively. These shafts 35 are inserted to shaft holes 15 respectively provided in both sides of the inner periphery 13 of the concave portion, and support the lid 30 in such a manner as to be able to open and close.

Further, paired guide arms 36, 36 each extending like a circular arc are attached to both sides of the back surface of the lid body 31. Incidentally, FIG. 1 shows only one of the guide arms 36, for convenience. Each of the guide arms 36 has a slit 36*a* at the center thereof and also has a claw portion 36*b* at an end thereof. Furthermore, an end portion of this guide arm 36 is inserted into a guide hole 16 provided in the inner periphery 13 of the instrument panel 10. Thus, the claw portion 36*b* engages with a back side of the guide hole 16 thereby to prevent the lid 30 from opening. That is, the lid 30 opens and closes by being guided by the guide arms 36 while supported by the shafts 35. The lid 30 opens to an angle at which the claw portion 36*b* of each of the guide arms 36 engages with the guide hole 16.

A lock device 40 for locking a closed state of the lid 30, which is caused by pushing the lid 30 into the concave portion 12 and then closing the concave portion 12, is provided in the lid 30. This lock device 40 includes a first link rod 41, a second link rod 42, a rotation lever 43 for connecting the base portions of these link rods to each other, and a spring 44 for elastically pushing the first link rod 41 outwardly from a side of the lid 30.

Figure 2:
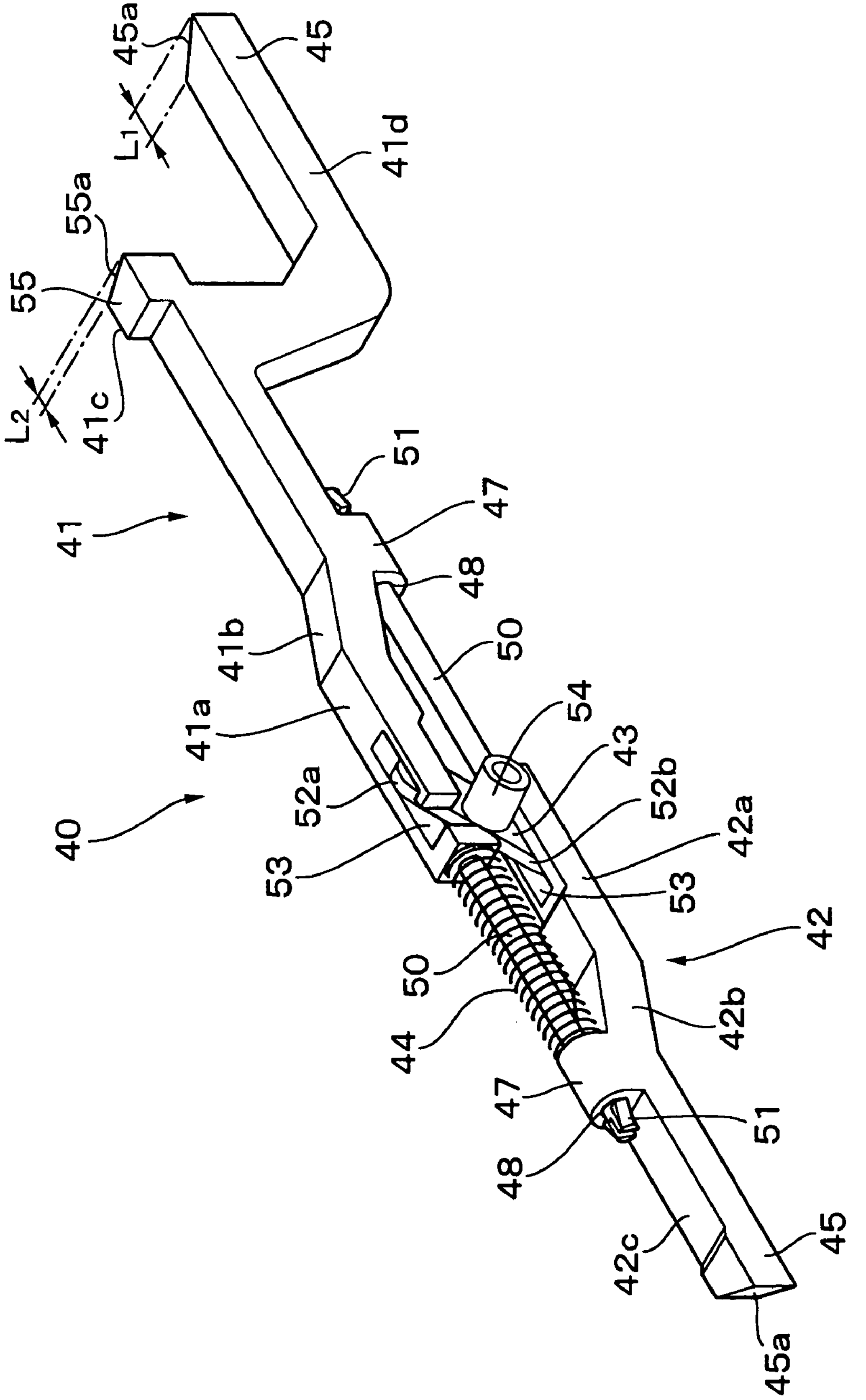
FIG. 2 is a perspective view illustrating a lock device used in the lid open-close apparatus.
Figure 3:
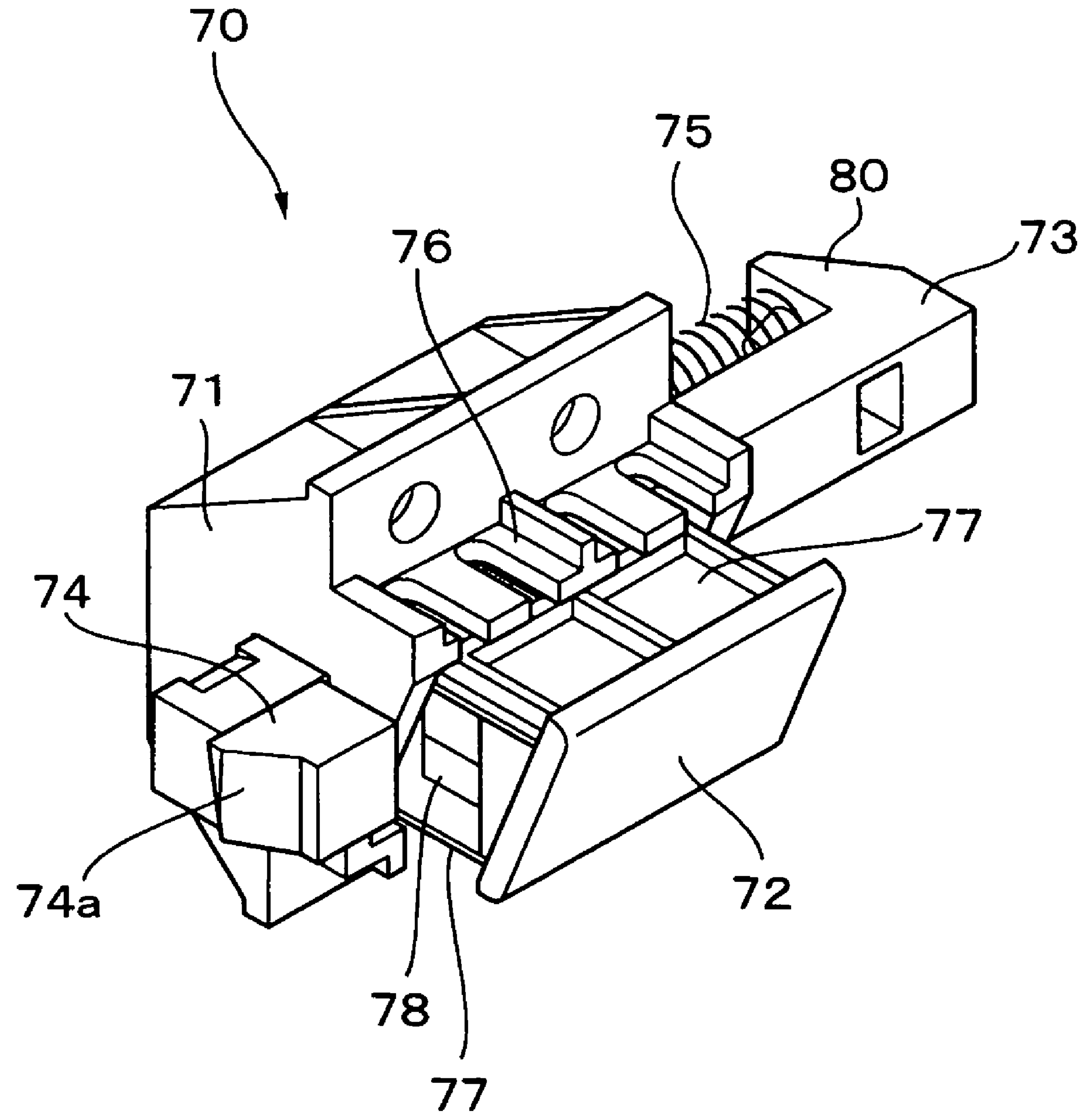
FIG. 3 is a perspective view illustrating an operating element used in the lid open-close apparatus.

Referring this figure together with FIG. 2, the rotation lever 43 has a central cylindrical portion 54, and a pair of arms 52*a*, 52*b* respectively extending outwardly from positions opposed in the circumferential direction of the cylindrical portion 54. Further, the shafts 371 (see FIG. 1) provided in such a way as to project to the inner surface of the lid body 31 are inserted into the cylindrical portion 54, so that the rotation lever 43 is turnably supported by the lid 30.

The fist link rod 41 has a holding hole 53 in a base portion 41*a*. One 52*a* of the arms of the rotation lever 43 is inserted into this holding hole 53, and the lever 43 is connected thereto in such a way as to be turnable around a support shaft (not shown). The first link rod 41 has an end portion coaxially extending from the base portion 41*a* through a slightly obliquely inclined intermediate portion 41*b*. This end portion is bifurcated into an end part 41*c* and the other end part 41*d*. The latter end part 41*d* extends in parallel to the former end part 41*c* in such a way as to be longer than the end part 41*c*. A lock piece 45 is formed at an end of the end part 41*d*. Further, an end face of the lock piece 45 is formed like a slope 45*a* in such a way as to project at the side of the face of the lid 30 and as to recede at the side of the back of the lid 30. Meanwhile, an end of the end part 41*c* is formed as a receiving portion 55, whose an end face is formed like a slope 45*a* in such a way as to protrude at the side of the face of the lid 30 and as to recede at the side of the back of the lid 30. Incidentally, an amount $L_1$ of projection of the slope 45*a* of the lock piece 45 is more than that $L_2$ of projection of the slope 55*a* of the receiving portion 55.

A guide portion 47 constituted by a portion, which is enlarged in diameter, is formed in the intermediate portion 41*b* of the first link rod 41. A guide hole 48 is formed in this guide portion 41. A guide shaft 50 is provided closer to the base end of the base portion 41*a* of the first link rod 41 in such a way as to protrude therefrom. An engaging claw 51 is formed at an end of this guide shaft 50.

The second link rod 42 has a structure nearly similar to that of the first link rod 41 except the shape of an end portion thereof. That is, the holding hole 53 is formed in the base portion 42*a* thereof. The other arm 52*b* of the rotation lever 43 is inserted into this holding hole 53, and the lever 43 is connected thereto in such a way as to be turnable around a support shaft (not shown).

The second link rod 42 has an end portion 42*c* extending more frontwardly through the slightly inclined intermediate portion 42*b*. Further, a lock piece 45, which is similar to that provided in the case of the first link rod 41, is formed at an end of the end portion 42*c*. A slope 45*a* is formed in an end face of this lock piece 45, similarly to that provided in the aforementioned case.

Further, a guide shaft 50, which is similar to that provided in the case of the first link rod 41, is provided closer to the base end of the base portion 42*a* of the second link rod 42 in such a way as to protrude therefrom. An engaging claw 51 is formed at an end of this guide shaft 50.

Each of the guide shafts 50 is inserted into the guide hole 48 of the other guide portion 47. Further, the engaging claw 51 is engaged with the peripheral edge of the guide hole 48 to thereby prevent these paired fist and second link rods 41 and 42 from being slipped off each other. Thus, the link rods 41 and 42 are assembled in such a way as to be expandable and contractable in directions toward both sides thereof.

Also, the spring 44 is intervened between portions provided on the outer periphery of the guide shaft 50 of the first link rod 41. The first link rod 41 is always pushed by this spring 44 in such a way as to outwardly be protruded. This pushing force is transmitted to the second link rod 42 through the arms 52*a* and 52*b* of the rotation lever 43, so that the second link rod 42 is elastically pushed in such a way as to outwardly project therefrom. The spring 44 constitutes an elastic member according to the invention. Incidentally, various kinds of spring members or rubber can be used as the elastic member.

The paired left and right lock pieces 45 of the lock device 40 are inserted into lock piece insertion holes 38, which are formed in side walls of the lid body 31, thereby to be projected from both sides of the lid 30. At that time, each of the engaging claws 51 of the guide shafts 50 engages with the peripheral edge of the associated guide hole 48 to thereby restrict a maximum amount of projection thereof. Further, the receiving portion 55 of the first link rod 41 is projected from a receiving portion insertion hole 39 formed in an upper portion of the right side face of the lid body 31.

Figure 6:
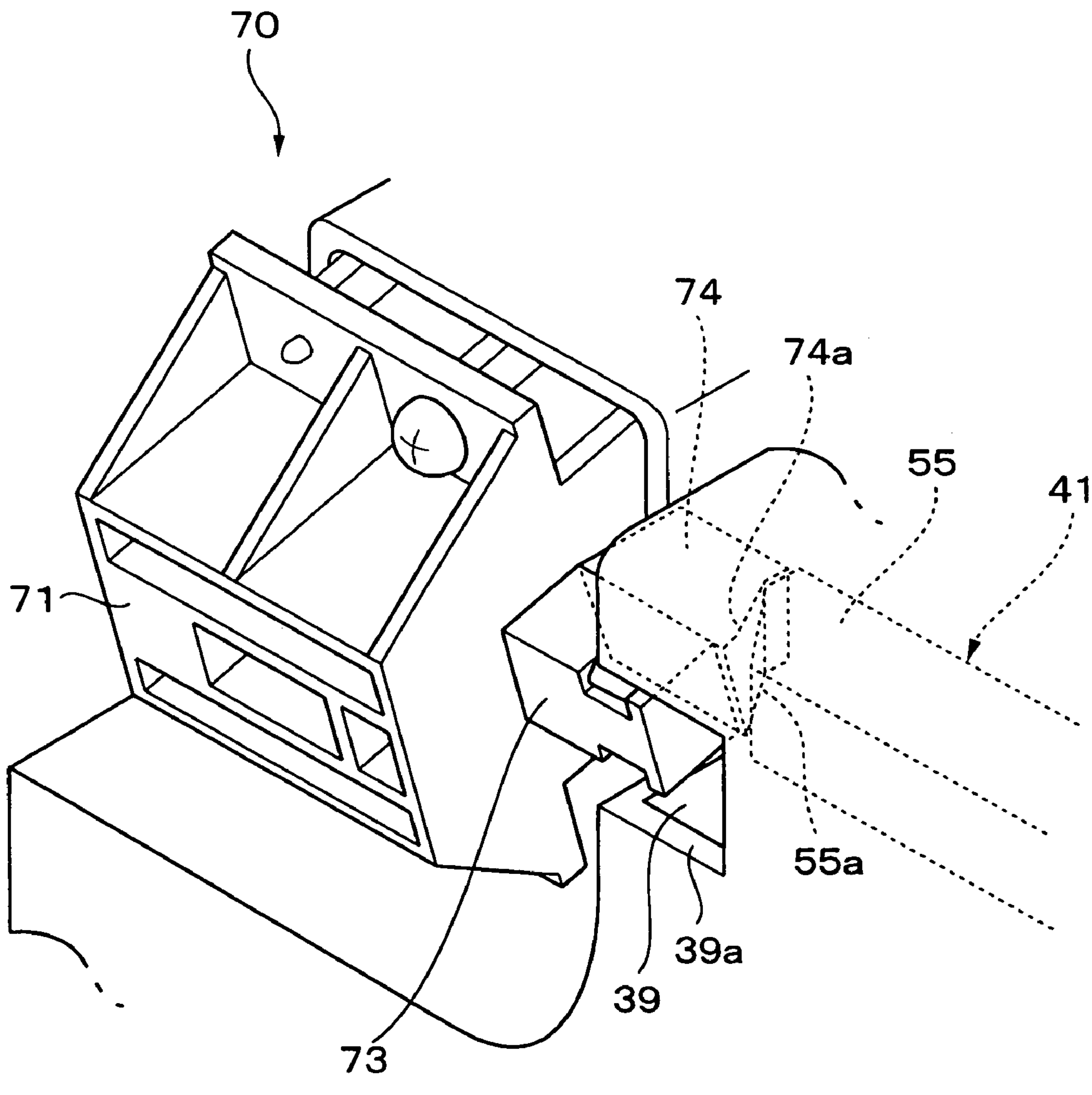
FIG. 6 is a perspective view illustrating a mounting condition of the operating element, which is taken from a rear side thereof.

As shown in FIG. 6, this receiving portion insertion hole 39 has a cutout 39*a* formed toward the back surface of the lid 30. A pusher 74 of an operating element 70 (to be described later) can be passed through this cutout 38*a* toward the rear thereof. Also, an engaging hole 17, with which the lock piece 45 engages, is formed in each of both side walls of the inner periphery 13 of the concave portion of the instrument panel 10.

Next, the structure of the operating element 70 is described by referring to FIGS. 3 to 6. As described above, the operating element 70 is mounted in the mounting hole 14 of the instrument panel 10. That is, the operating element 70 mainly includes a housing 71 attached to the inside of the mounting hole 14 of the instrument panel 10, a pushbutton 72 attached to this housing 71 in such a way as to be pushed thereinto, a slide bar 73 that is inserted through the housing 71 in such a way as to be able to laterally slide and caused by the pushbutton 72 in such a manner as to slide, and a spring 75 for elastically pushing this slide bar 73 in a predetermined direction.

The housing 71 has a concave portion surrounded by a guide frame 76 so as to accept the pushbutton 72. The pushbutton 72 is provided with a pair of guide pieces 77, 77 to be inserted into the concave portion of the housing 71. A pushing rod 78 is provided between the guide pieces 77 in such a way as to project therefrom.

Figure 4:
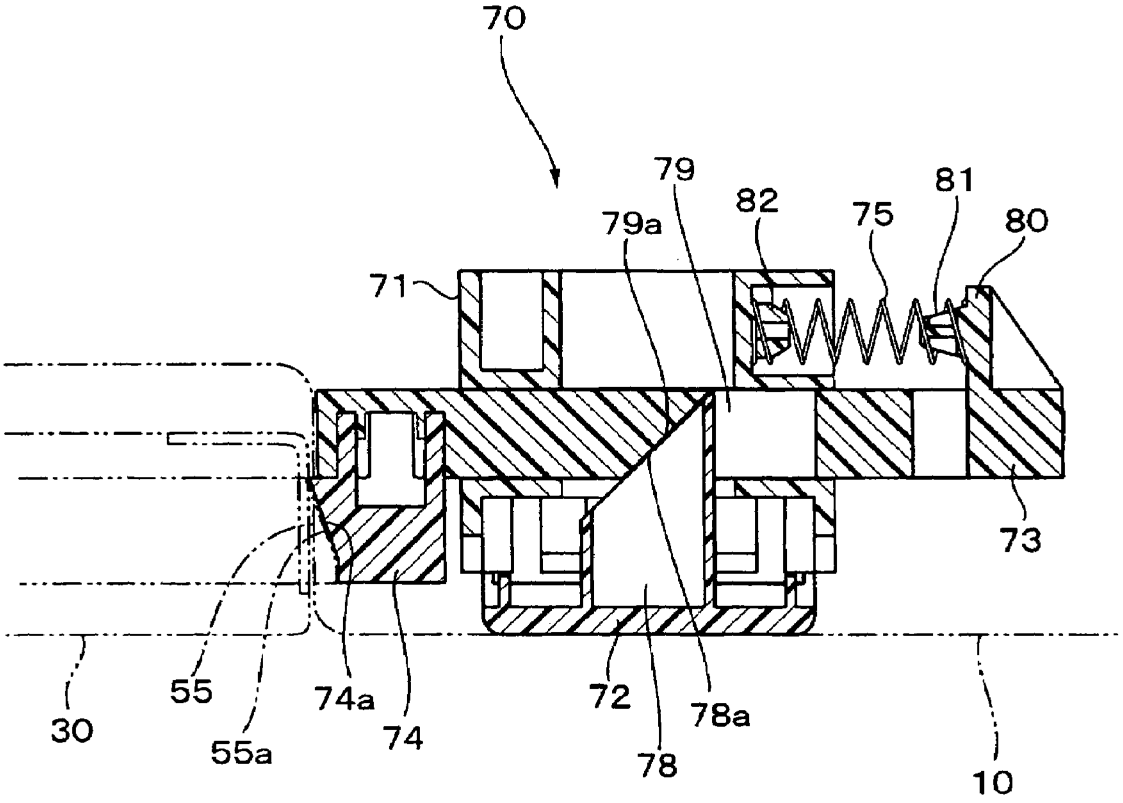
FIG. 4 is a cross-sectional view illustrating a state of the operating element, in which a pushbutton is not pushed.
Figure 5:
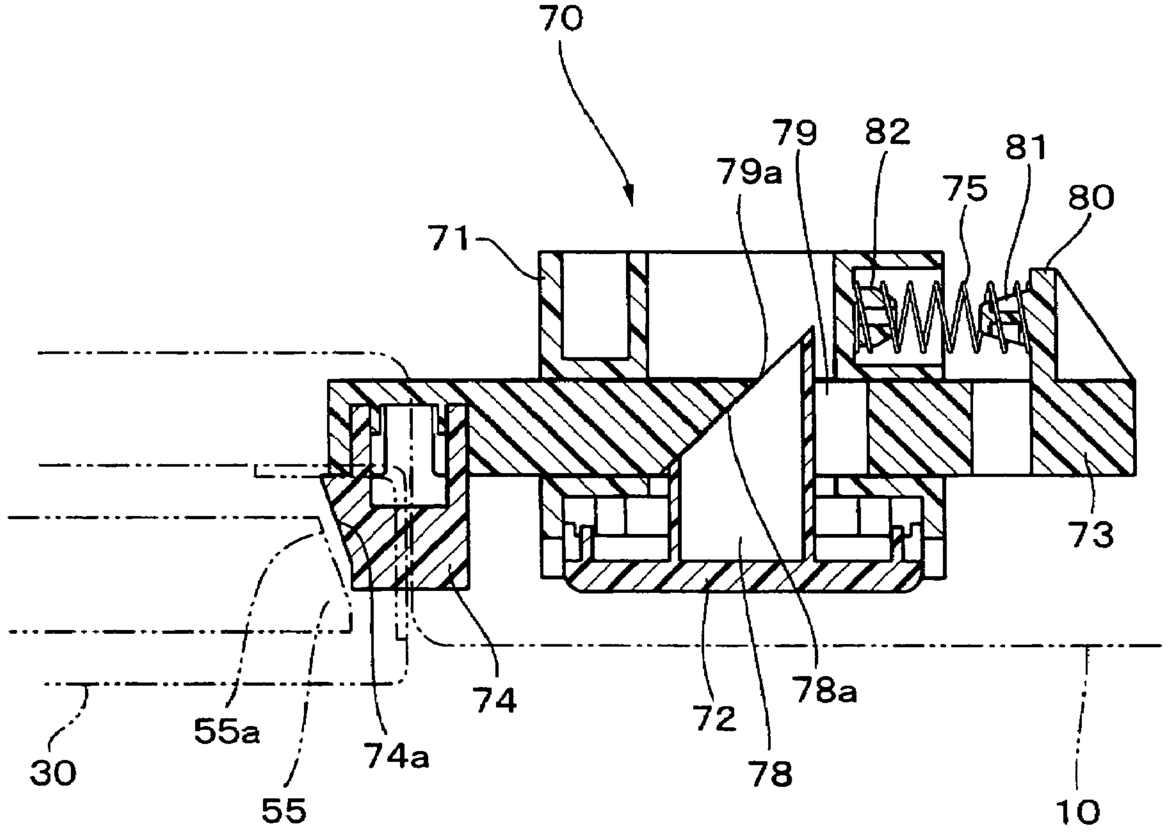
FIG. 5 is a cross-sectional view illustrating a state of the operating element, in which the pushbutton is pushed.

Referring to FIGS. 4 and 5, an end surface of the pushing rod 78 is formed as a slope 78*a*. Meanwhile, the slide bar 73 is passed through the housing 71 laterally, and has a through hole 79 in the intermediate portion. A slope 79*a* abutting against the slope 78*a* of the pushing rod 78 is formed in the inner surface of this through hole 79.

A projection portion 80 is provided at one of end port ions of the slide bar 73. A spring receiver 81 is provided in this projection portion 80 in such a manner as to protrude therefrom. Meanwhile, the housing 71 is provided with a spring receiver 82 formed on a surface opposed to the projection portion 80. Further, the aforementioned spring 75 has an end, which is supported by the spring receiver 81 of the projection portion 80, and the other end supported by the spring receiver 82 of the housing 71. The spring 75 elastically and rightwardly pushes the slide bar 73, as viewed in FIG. 4.

Then, when the pushbutton 72 is pushed, the pushing rod 78 is pushed, and thereby the slope 78*a* pushes the slope 79*a* formed on the inner surface of the through hole 79 in the slide bar 73 and to move the slide bar 73 against the pushing force of the spring 75 leftwardly, as viewed in FIG. 4, and to bring the left end portion thereof into a condition shown in FIG. 5.

The pusher 74 is attached to the left end portion of the slide bar 73. An end surface of this pusher 74 is formed as a slope 74*a* whose part provided at the side of the inside of the concave portion 12 more largely projects therefrom. As shown in FIG. 1, the pusher 74 is adapted to project from the inner periphery 13 of the concave portion of the instrumental panel 10 through a hole 18 formed in a rightwardly upwardly wall part of the inner periphery 13 thereof.

Further, when the lid 30 is closed, the receiving portion 55 of the first link rod 41 is placed in the hole 18 of the instrument panel 10. The slide bar 73 is slid by the pushbutton 72. When the pusher 74 is pushed out, the slope 55*a* of the receiving portion 55 is pushed by the slope 74*a* of the pusher 74.

Next, an operation of this lid open-close apparatus is described hereinbelow.

When the lid 30 is turned toward the concave portion 12 in a direction in which the lid 30 is closed, the inner periphery 13 of the concave portion abuts against the slope 45*a* of the lock piece 45 projecting from the lock piece insertion hole 38. Consequently, each of the lock pieces 45 is pushed by being guided by the slope 45*a*. The paired left and right link rods 41 and 42 slide against the pushing force of the spring 44 in such a way as to be drawn into the lid 30, while turning the rotation lever 43. Thus, when the lid 30 is fitted into the concave portion 12, the lock pieces 45 reach the engaging holes 17 formed in both sides of the inner periphery 13 of the concave portion and engage with the engaging holes 17 by being fitted thereinto by the pushing force of the spring 44. Consequently, the lid 30 is locked in a state in which the concave portion 12 is closed.

Figure 7:
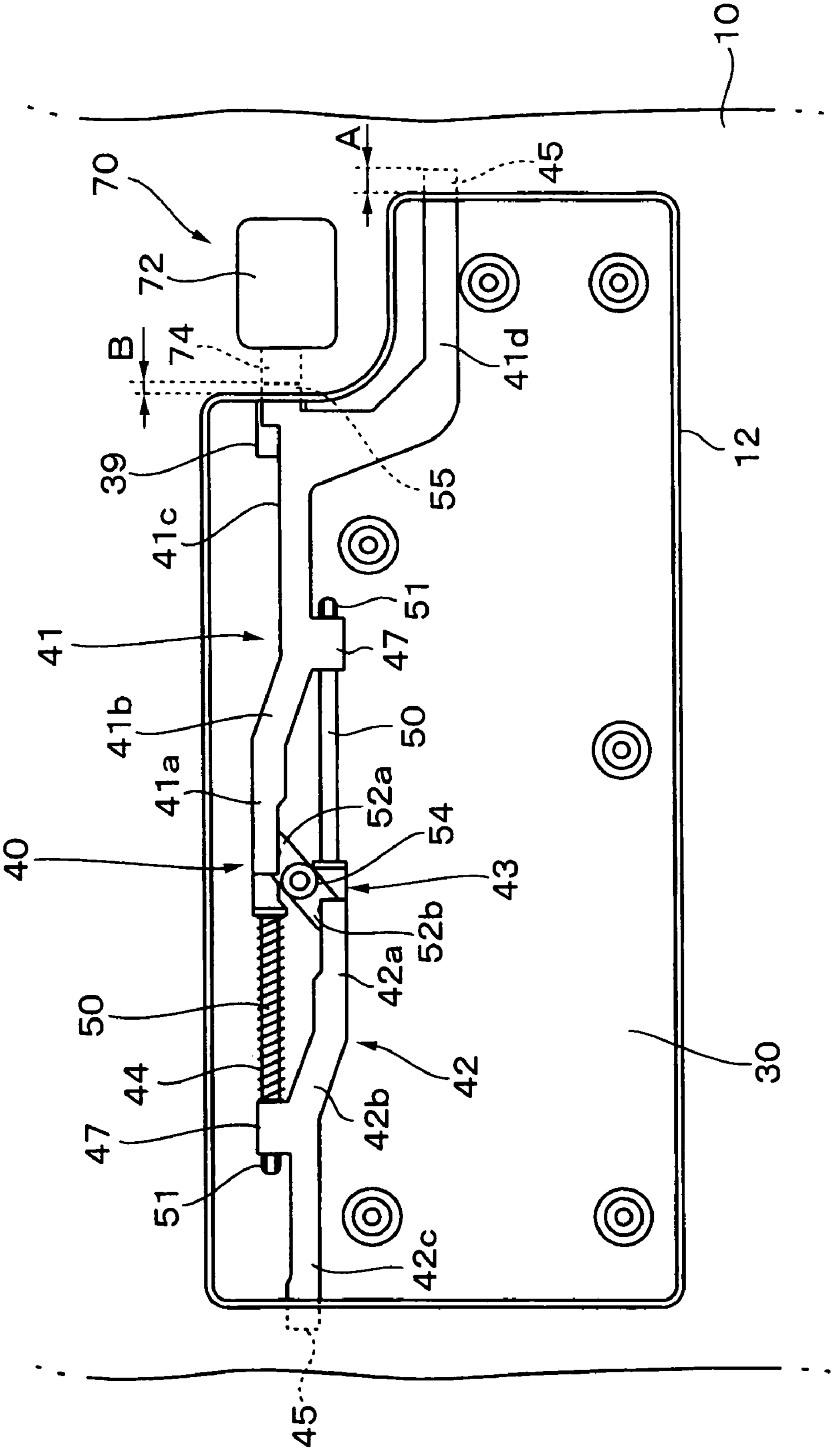
FIG. 7 is an explanatory view illustrating a lock state of the lid open-close apparatus, which is taken frown a front side thereof.

FIG. 7 shows this lock state. At that time, as described above, the paired left and right lock pieces 45 protrude from the lock piece insertion holes 38 of the lid 30. Further, the lock pieces 45 are fitted into the engaging holes 17 of the inner periphery 13 of the concave portion. Furthermore, the receiving portion 55 of the first link rod 41 outwardly projects from the lid 30 through a receiving portion insertion hole 39 of the lid 30 and is inserted into the hole 18 of the inner periphery 13 of the concave portion.

In this case, as described above, the amount $L_1$ of projection of the slope 45*a* of the lock piece 45 is larger than that $L_2$ of projection of the slope 55*a* of the receiving portion 55. Additionally, an amount A of projection of the lock piece 45 from the side wall of the lid 30 is set to be larger than that B of projection of the receiving portion 55 from the side wall of the lid 30. Thus, when the lock piece 45 abuts against the inner periphery 13 of the concave portion and is drawn into the lid 30, the receiving portion 55 is surely drawn into the lid 30 in such a way as to be prevented from getting caught in the inner periphery 13 of the concave portion.

Next, an operation of canceling the lock of the lock device 40 and opening the lid 30 is described hereinbelow. When the lid 30 is opened, it is necessary only to push the pushbutton 72 of the operating element 70. That is, when the pushbutton 72 is pushed, the slope 78*a* of the pushing rod 78 pushes the slope 79*a* provided in the through hole 79 of the slide bar 73, as shown in FIGS. 4 and 5. Thus, the slide bar 73 is slid leftwardly against the pushing force of the spring 75, as viewed in FIG. 4. Thus, the pusher 74 is pushed out, as shown in FIG. 5. The pushed-out pusher 74 projects from the hole 18 of the inner periphery 13 of the concave portion and pushes the slope 55*a* of the receiving portion 55 of the first link rod 41 provided in the lid 30. Consequently, the first link rod 41 is slid in such a way as to be drawn into the lid 30. The lock piece 45 is inwardly drawn from the lock piece insertion hole 38 of the lid 30.

Figure 8:
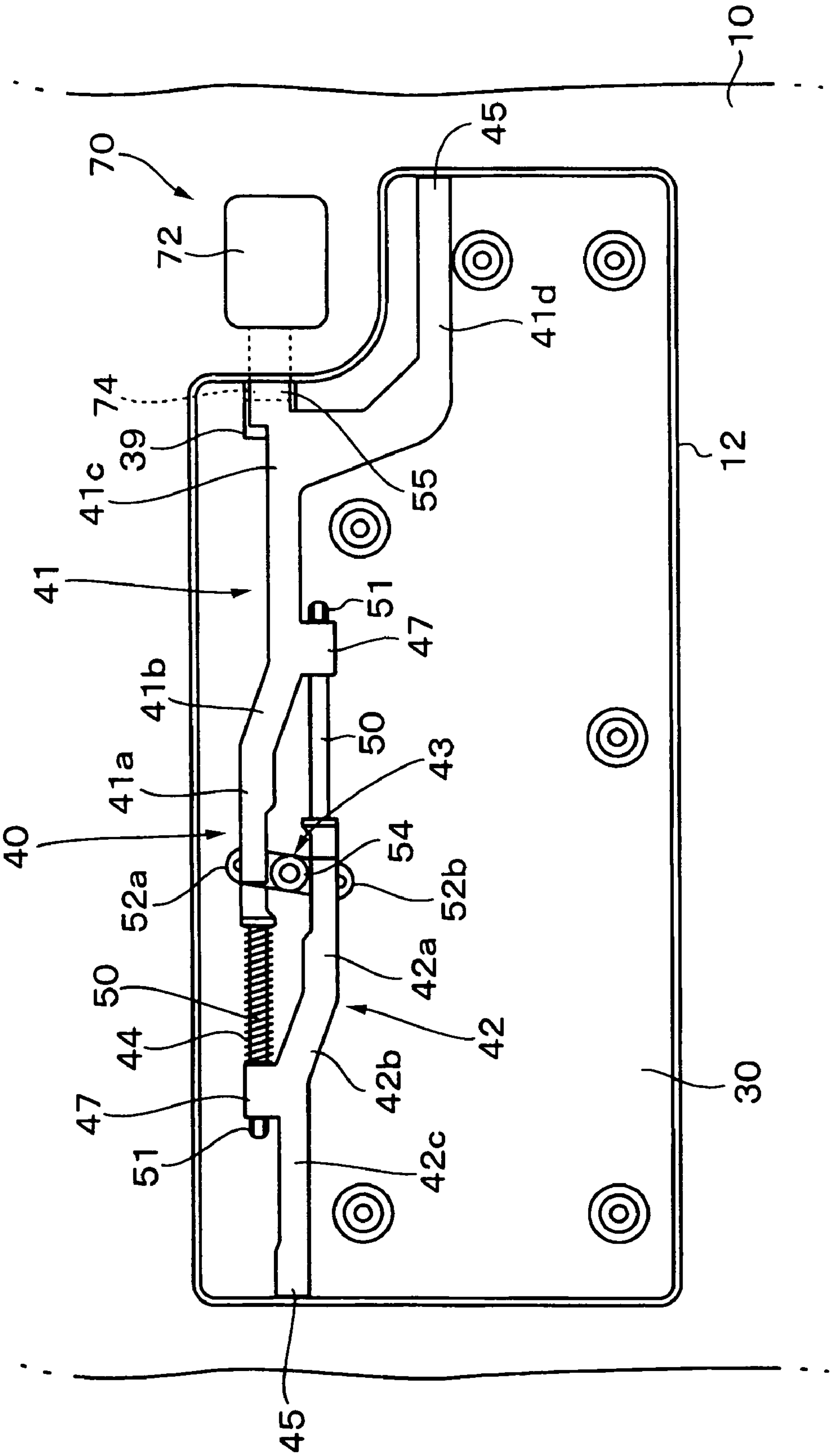
FIG. 8 is an explanatory view illustrating a lock cancellation state of the lid open-close apparatus, which is taken from a front side thereof.

Further, when the first link rod 41 slides, the second link rod 42 is also drawn into the lid 30 through the rotation lever 43. The lock piece 45 of the second link rod 42 is also drawn into the lock piece insertion hole 38. Consequently, as shown in FIG. 8, the engagement of the paired left and right lock pieces 45 with the engaging holes 17 of the inner periphery 13 of the concave portion is canceled, so that the lock of the closed state of the lid 30 is canceled. Further, when the slope 74*a* of the pusher 74 pushes the slope 55*a* of the receiving portion 55, such slopes cause a force to act in a direction in which the lid 30 is opened. Thus, the lock of the lid 30 is canceled. Simultaneously, the lid 30 is pushed out slightly frontwardly. Consequently, the own weight of the lid 30 causes the lid 30 to more largely open. The lid 30 turns to a position, in which the claw portion 36*b* of the guide arm 36 engages with the guide hole 16, and stops.

Incidentally, in some cases, the lid 30 is not opened by the own weight thereof according to the mounting position of the lid 30. However, in such a case, the slopes 74*a* of the pusher 74 and the slope 55*a* of the receiving portion 55 bring the lid 30 into a state in which the lid is slightly opened frontwardly. Thus, the lid 30 can easily be opened by engaging a finger therewith.

Incidentally, in this embodiment, as described above, the concave portion 12 has a shape, in which the right corner portion of the rectangle is inwardly cut out. The operating element 70 is mounted in this cutout portion through the mounting hole 14. Thus, the entire lid open-close apparatus is fitted into a rectangle. Consequently, a space for adjacent equipment and materials can be ensured. Incidentally, in a case where there is spatial margin, each of the concave portion 12 and the lid 30 can be shaped like a rectangle. Thus, the operating element 70 can be provided thereoutside.

Furthermore, in this embodiment, the receiving portion 55 pushed by the pusher 74 and the base portion 41*a* of the first link rod 41 are placed substantially coaxially. Additionally, the guide shaft 50 extends to a side closer to the base end of the base portion 41*a*. The spring 44 attached to the outer periphery thereof outwardly pushes the first link rod 41. Further, a pressing force which the receiving portion 55 undergoes acts upon the guide shaft 50, to which the spring 44 is attached by insertion, nearly coaxially. This enables reduction of a prying force and a bending force and smoothly achieves a lock cancellation operation.

Figure 9:
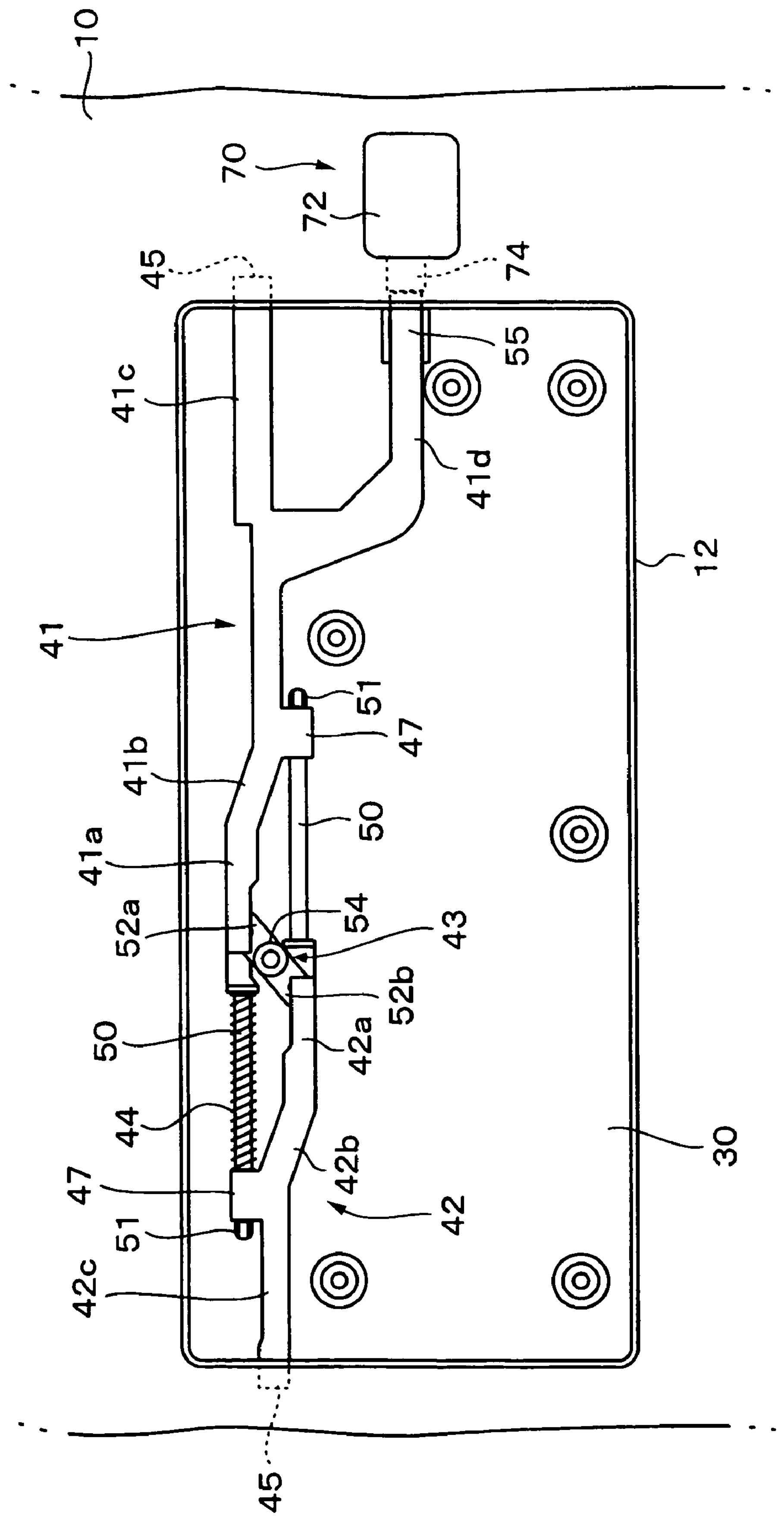
FIG. 9 is an explanatory view illustrating another embodiment of the lid open-close apparatus according to the invention, which is taken from a front side thereof.

FIG. 9 shows another embodiment of the lid open-close apparatus according to the invention. This embodiment differs from the aforementioned embodiment in the shape of the first link rod 41. That is, an end portion of the first link rod 41 is bifurcated, so that the lock piece 45 is formed at the end portion 41*c* extending coaxially with the base portion 41*a*. Further, the other end portion 41*d*, which is also bifurcated, extends in parallel to the end portion 41*c*. The receiving portion 55 is formed at an end part thereof.

The lock pieces 45 of the paired left and right link rods, that is, the first link rod 41 and the second link rod 42 are outwardly projected from the positions close to the top corner portions on both side surface of the lid 30. Meanwhile, the receiving portion 55 formed at the other end portion 41*d* of the first link rod 41 projects from a central portion of the right side surface of the lid 30. The operating element 70 is provided at a part located thereoutside.

Because the lock pieces 45 of the paired left and right link rods, that is, the first link rod 41 and the second link rod 42 are placed in such a way as to outwardly be projected from the upper parts of both side surfaces of the lid 30, the lock state of the lid 30 can be held more securely.

Incidentally, although each of the aforementioned embodiments is applied to a side lock mechanism in which paired lock pieces move into and out of the lid 30 from both side surfaces thereof, the invention can be applied to a lock device of the type adapted so that one lock piece moves in and out of the lid 30 from a central part of the top side thereof. Further, although the lid 30 is shaped like a plate as a whole and opens and closes an opening part of the concave portion 12 in the embodiments, the invention can be applied to an open-close apparatus of what is called the glove box type, in which the lid 30 itself constitutes a storage container. Additionally, the operating element is not limited to the aforementioned push-button type one and may be that a lever type one.

The apparatus according to the invention can be utilized as the lid open-close apparatus enabled to easily perform operations of opening, closing, and locking, for example, a glove box of an automobile from a relatively remote position, with a simple structure using a small number of components.

What is claimed is:

1. A lid open-close apparatus comprising:

a lid openably mounted in a concave portion, which is provided at a vehicle side;

a lock device for locking a closed state of the lid; and an operating element, which is disposed at the vehicle side close to the concave portion, for releasing the lock device, wherein:

the lock device has a lock piece, which is provided in the lid and moves into and out of the lid from a peripheral edge thereof and is usually elastically pushed in such a way as to project from the peripheral edge thereof and engages with an engaging hole provided in an inner periphery of the concave portion;

the operating element has a pusher adapted to push a receiving portion, which is provided in a part interconnected to the lock piece, to thereby cancel engagement of the lock piece, wherein the lock device includes:

a rotation member turnably supported by the lid;

a pair of link rods that are respectively provided on the rotation member so as to be linearly movable, and extending in directions of both sides of the lid;

the lock pieces attached to ends of the link rods; and an elastic member for elastically pushing the lock pieces in such a way as to project from both side walls of the lid; and wherein the pusher is configured to provide an opening force onto the lid in an opening direction thereof while pushing the receiving portion.

2. The lid open-close apparatus according to claim 1, wherein:

an end portion of one of the link rods is bifurcated into one end part, which extends nearly coaxially with the base portion and has an end constituting a receiving portion to be pushed by the pusher, and into the other end part extending in nearly parallel to the one end part and having an end constituting the lock piece; and the elastic member is disposed in such a way as to axially push the base portions of the link rods.

3. The lid open-close apparatus according to claim 1, wherein an end portion of one of the link rods is bifurcated into one end part, which extends nearly coaxially with the base portion and has an end constituting the lock piece, and into the other end part extending in nearly parallel to the one end part and having an end constituting a receiving portion to be pushed by the pusher.

4. The lid open-close apparatus according to claim 2, wherein:

each of the lock pieces has a slope, which has a part provided at a face side of the lid projects and a part provided at a rear side of the lid retreats, and abuts against a peripheral edge of the concave portion and is drawn into the lid when the lid is closed; and the lock piece projects outwardly from the lid more largely than the receiving portion.

5. The lid open-close apparatus according to claim 2, wherein the lock piece is largely projected more outwardly from the lid than the receiving portion.

6. The lid open-close apparatus according to claim 1, wherein the receiving portion includes a first slope that is tapered toward a rear side of the concave portion so as to receive the opening force by the pusher.

7. The lid open-close apparatus according to claim 1, wherein the pusher includes a second slope that is tapered toward a front side of the concave portion so as to provide the opening force to the receiving portion.

* * * * *

UNITED STATES PATENT AND TRADEMARK OFFICE

CERTIFICATE OF CORRECTION

PATENT NO. : 7,475,929 B2
APPLICATION NO. : 11/189014
DATED : January 13, 2009
INVENTOR(S) : Satoshi Yamada It is certified that error appears in the above-identified patent and that said Letters Patent is hereby corrected as shown below:

On the title page, item [73] should read -- (73) Assignee: Piolax, Inc. --.

Signed and Sealed this

Third Day of March, 2009

JOHN DOLL
*Acting Director of the United States Patent and Trademark Office*